United States Patent
Choiniere et al.

(10) Patent No.: US 8,734,706 B2
(45) Date of Patent: May 27, 2014

(54) CARBON COMPOSITE MOLD DESIGN

(75) Inventors: Paul Choiniere, Livermore, CA (US); Glenn Aune, Bellingham, WA (US); John Difonzo, Emerald Hills, CA (US); Daniel Hong, Cupertino, CA (US); Kevin Kenney, San Jose, CA (US)

(73) Assignee: Apple Inc., Cupertino, CA (US)

( * ) Notice: Subject to any disclaimer, the term of this patent is extended or adjusted under 35 U.S.C. 154(b) by 139 days.

(21) Appl. No.: 13/566,251

(22) Filed: Aug. 3, 2012

(65) Prior Publication Data

US 2012/0302670 A1 Nov. 29, 2012

Related U.S. Application Data

(63) Continuation of application No. 12/615,141, filed on Nov. 9, 2009, now Pat. No. 8,257,075.

(60) Provisional application No. 61/113,170, filed on Nov. 10, 2008.

(51) Int. Cl.
*B29C 45/40* (2006.01)

(52) U.S. Cl.
USPC ............. 264/334; 249/68; 264/344; 425/438; 425/556

(58) Field of Classification Search
USPC ........ 264/166, 334, 344; 425/89, 192 R, 438, 425/443, 556; 249/67, 68, 114.1, 115
See application file for complete search history.

(56) References Cited

U.S. PATENT DOCUMENTS

| | | | |
|---|---|---|---|
| 1,641,923 A | 9/1927 | Davis | |
| 6,196,824 B1 | 3/2001 | Foltuz et al. | |
| 6,348,173 B1 | 2/2002 | Anderson | |
| 6,355,343 B1 | 3/2002 | Glassock | |
| 6,616,870 B1 | 9/2003 | Goela et al. | |
| 6,773,247 B1 | 8/2004 | Osada et al. | |
| 6,923,635 B2 | 8/2005 | Burgess | |
| 7,204,685 B1 | 4/2007 | Crain et al. | |
| 7,223,088 B2 | 5/2007 | DiSimone | |
| 7,227,741 B2 | 6/2007 | Garel et al. | |
| 7,462,319 B2 | 12/2008 | Keir et al. | |

(Continued)

FOREIGN PATENT DOCUMENTS

| | | |
|---|---|---|
| JP | 2002-371197 | 12/2002 |
| JP | 2003-012945 | 1/2003 |
| TW | 094122916 | 1/2007 |
| WO | WO 00/43830 | 7/2000 |

*Primary Examiner* — Yogendra Gupta
*Assistant Examiner* — Emmanuel S Luk
(74) *Attorney, Agent, or Firm* — Brownstein Hyatt Farber Schreck, LLP (57) ABSTRACT

A mold assembly or system includes a moldbase that holds mold inserts and has embedded fluid lines to facilitate cooling during part formation. Mold inserts combine to form mold cavities that receive carbon fiber and resin components to form a carbon composite based part. A permanent release coating along a mold component surface that contacts the carbon fiber and resin components facilitates the release of the finished part from the mold component. Guide pins and guide pin receiving holes facilitate accurate alignment of mold components. Ejector pins within respective ejector pin shafts help eject a finished part from a respective mold component. An ejector pin shaft cover transfers force from an ejector pin to eject a finished part and also prevents substantial passage of resin into the ejector pin shaft. A fluid actuated ejection system provides fluid based mechanical forces to the ejector pins to facilitate finished part ejection.

22 Claims, 4 Drawing Sheets

(56) References Cited

U.S. PATENT DOCUMENTS

| | | |
|---|---|---|
| 7,497,677 B1 | 3/2009 | Crian et al. |
| 8,257,075 B2 | 9/2012 | Choiniere et al. |
| 8,425,217 B2 * | 4/2013 | Groleau ........................ 425/149 |
| 2002/0018825 A1 | 2/2002 | Starkey |
| 2002/0041058 A1 | 4/2002 | Murphy |
| 2002/0185584 A1 | 12/2002 | Westmoreland |
| 2003/0057596 A1 | 3/2003 | Story et al. |
| 2008/0115904 A1 | 5/2008 | Aversenti |
| 2008/0152753 A1 | 6/2008 | Chen et al. |
| 2009/0081324 A1 | 3/2009 | Kuo |

\* cited by examiner

CARBON COMPOSITE MOLD DESIGN

CROSS REFERENCE TO RELATED APPLICATION

This application is a Continuation of co-pending U.S. patent application Ser. No. 12/615,141, filed Nov. 9, 2009, entitled "CARBON COMPOSITE MOLD DESIGN," which claims the benefit of U.S. Provisional Application No. 61/113,170, filed Nov. 10, 2008, entitled "CARBON COMPOSITE MOLD DESIGN," which is incorporated herein by reference in its entirety and for all purposes.

TECHNICAL FIELD

The present invention relates generally to the formation of carbon composite based components, and more particularly to the use of molds to form such carbon composite based components.

BACKGROUND

There are currently a wide number of known ways to form aesthetically pleasing parts and components for items made from various materials across many industries. For example, general part formation can be had by way of machining, casting, stamping, extrusion, cold drawing and injection molding, among numerous other alternatives. Where particularly strong parts or components are desired, another common part formation process can involve composite molding.

Composite molding generally involves molding a combination of different materials, each having a particular mechanical strength in a different direction, to form a final product that has mechanical strengths in multiple directions. Many popular forms of composite molding involve the use of carbon fibers or another similar component and a resin material, the molded combination of which results in a relatively strong part or component, particularly with respect to the weight of the part. Generally, fibers and resin are placed over or into a mold and are then cured under increased heat and pressure. Fibers typically come in sheet form, which can include "prepreg" or resin impregnated sheets, and are often layered into the mold sheet by sheet. Such a layering process is often performed manually by an operator, as are other steps in a typical composite molding of a part.

Because resins tend to stick to mold surfaces, removal of a finished part from a mold can be a tricky process that often also involves manual intervention by an operator. Despite the application of a temporary release coating to inner mold surfaces prior to placing in the composite materials, the removal of a finished part from a composite mold still can involve prying and peeling the part away from the inner mold surfaces. Surface defects and blemishes on composite molded parts often occur as a part of the molding and mold removal process, which results in many parts having unique defects or appearances. Further, temperature discrepancies from molded part to molded part using traditional composite molding processes can also result in blemishes or defects that are different for each part. Due to these particular examples and other concerns that relate to composite molding, many composite molding processes are highly manual labor intensive by nature, and often result in the formation of parts that are not fully consistent from part to part.

This is unfortunate in that many manufacturers might desire the mass production of consistent parts that have the strength of carbon composite components. As but one example, it would be particularly helpful if portable electronic device housings and components could be stronger and more durable than what is now typically provided in plastic parts that are formed via ordinary plastic injection molding processes. In particular, it would be beneficial if laptops, notebook computers, and other relatively large and heavy portable computing devices could have outer housings that are better able to protect the entire device from drops and other mechanical shocks. Although a material having the toughness of a good carbon composite would be useful, the ability to mass produce laptop housings that are consistent in appearance and performance from such a material would be difficult. Of course, there are a myriad of other examples of parts where it would be desirable to form them from a stronger material such as a carbon composite.

While many designs and methods of manufacture for providing composite molded parts and components have generally worked well in the past, there is always a desire to provide new and improved designs and processes that result in functional and aesthetically pleasing composite parts that can be mass produced. In particular, it is desirable to provide a carbon composite molding apparatus and process that allows for a more automated mass production of consistent carbon composite parts, such as for computer housings and the like.

SUMMARY

The present invention provides systems and methods that facilitate the mass production of consistent and aesthetically pleasing composite molded parts, such as carbon fiber and resin based composite parts. Such parts can be used for a variety of applications, such as to form outer housings for a laptop computer or other similar device. This can be accomplished by providing a variety of manufacturing techniques and features to traditional composite mold processes, so as to streamline the manufacturing process and to result in the mass manufacture of consistent parts.

In various embodiments, the invention can include an apparatus adapted to form carbon composite based parts, with the apparatus having a first mold portion including a first mold cavity, a second mold portion adapted to mate with the first mold portion so that composite parts can be formed therebetween, a plurality of ejector pins located within a plurality of respective ejector pin shafts that are formed within one of the mold portions, and an ejector pin shaft stopper fitted within at least one of the plurality of ejector pin shafts. The plurality of ejector pins can be adapted to aid in the ejection of a carbon composite based part from one or both of the mold portions, while the ejector pin shaft stopper can be adapted to transfer a mechanical force from a respective ejector pin to the actual carbon composite part for ejection of the part from a respective mold portion. Also, the ejector pin shaft stopper can be further adapted to prevent the substantial passage of any resin component into its respective ejector pin shaft during the formation of the carbon composite based part.

In various detailed embodiments, a mold assembly for forming carbon composite parts can further include a variety of items. A moldbase can be adapted to hold one or more mold inserts, with the moldbase having one or more internal fluid lines embedded therein to facilitate a fluid based cooling of components during the formation of a carbon composite based part. A plurality of mold inserts, at least one of which is held by the moldbase, can combine to form one or more mold cavities therebetween while held by the moldbase such that one or more materials including a carbon fiber component and a resin component can be placed therein for the formation of the carbon composite based part. At least one of the mold inserts can include a permanent release coating along a surface that contacts the carbon fiber and resin materials to facilitate the release of the carbon composite based part therefrom. One or more guide pins and guide pin receiving holes can be located on at least one of the moldbase and/or plurality of mold inserts, with the one or more guide pins and guide receiving holes being adapted to facilitate the accurate alignment of mold inserts with each other for the formation of the carbon composite based part. Again, a plurality of ejector pins located within a plurality of respective ejector pin shafts having an ejector pin shaft stopper fitted therewithin can be used. Also, a fluid actuated ejection system adapted to provide fluid based mechanical forces to the plurality of ejector pins to facilitate the ejection of the carbon composite based part from a respective mold insert can be incorporated into the system. In some embodiments, the fluid actuated ejection system can operate using a gas to provide gas based mechanical forces to the ejector pins.

In various embodiments, a removable film can be positioned proximate to the permanent release coating, wherein the removable film is adapted to facilitate the release of a carbon composite based part from its respective mold insert, and wherein the removable film can be readily removed from both its respective mold insert and the carbon composite based part. Such a removable film can also serve as an ejector pin shaft cover or stopper by covering the top of one or more of the ejector pin shafts during the formation of a carbon composite based part. In some embodiments, the removable film can be used in addition to or in lieu of the ejector pin shaft stoppers placed within the ejector pin shafts. In some embodiments, the removable film has a thickness of about 10 to 20 microns.

In various embodiments, the permanent release coating or layer can be formed from nickel-teflon, titanium-nitride, an amorphous carbon/diamond like material, chrome or chrome alloy, or NEDOX®. The permanent release coating can have a thickness of about 1 to 5 microns, although other suitable thicknesses may also be used. The permanent release coating or layer can be situated on one mold insert or component or multiple mold components.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatus and method for providing a carbon composite based mold design and system. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to the formation of composite based parts in a more streamlined and consistent manner. Such systems and methods can be used to form aesthetically pleasing carbon composite based parts for items such as, for example, outer housings for a laptop or other portable personal computing device. Such carbon composite based outer housings can be visually appealing to users while also being much stronger and more able to protect the various sensitive computing components held therein.

In various embodiments of the present invention, an improved system and process for forming a composite part is provided. Particular examples can include carbon fibers and resins as the composite materials of formation, and epoxies are preferred as a resin material. Various resulting composite parts may include outer housings for laptop computers or other portable computing devices, and may also include or relate to parts with respect to an entire personal computing device. Other applications for carbon composite parts formed via the inventive systems and methods herein may also apply, as will be readily apparent.

As is generally known in the carbon composite arts, traditional part formation processes can be relatively crude, and can involve an abundance of manually performed steps and procedures. Such steps and procedures can naturally result in imperfections and resulting products that are not uniform from product to product. The present invention makes use of a variety of manufacturing items and techniques that help to streamline the manufacturing process, reduce the amount of manual intervention required, and result in finished composite parts and components that are consistent from part to part.

Figure 1:
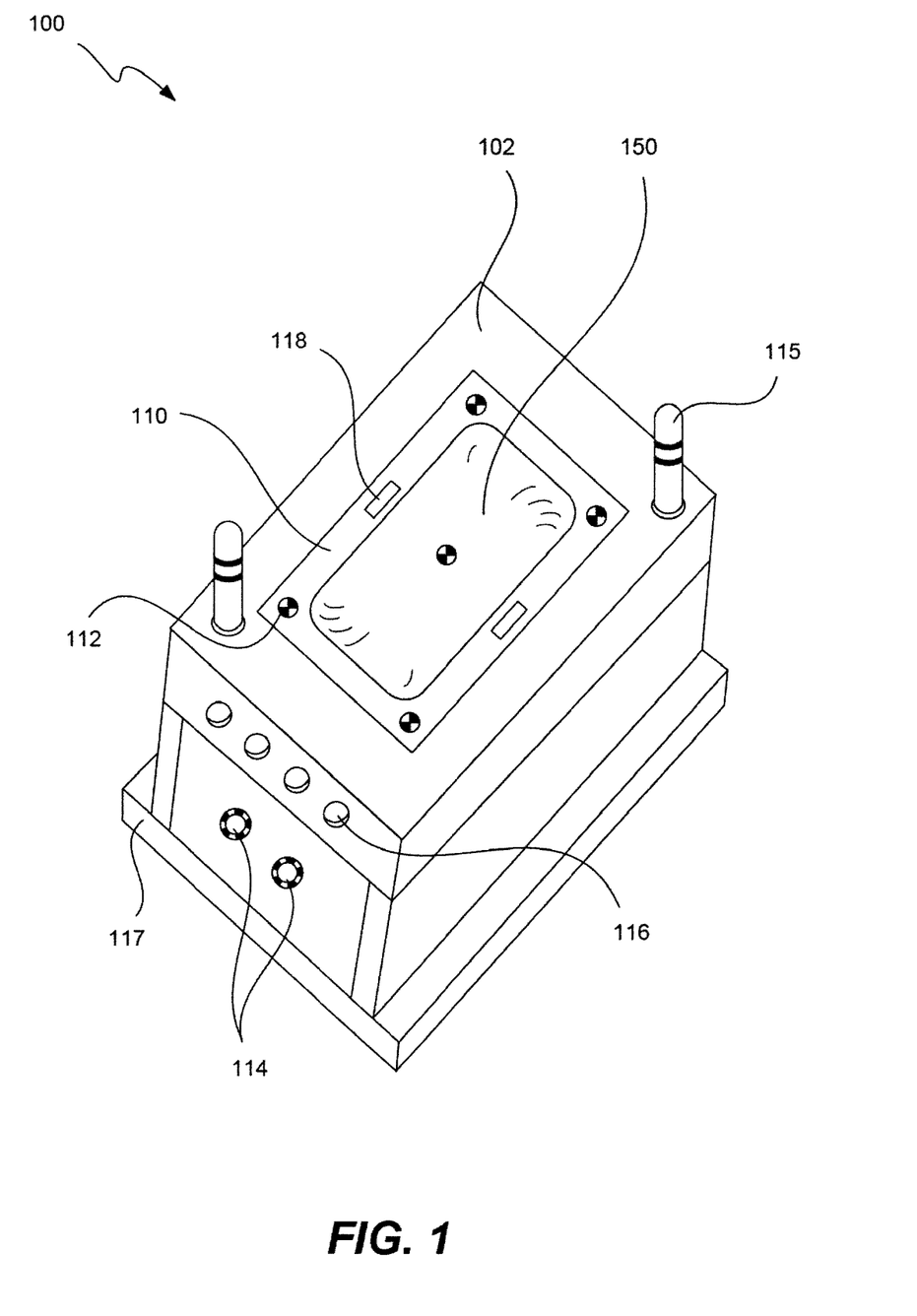
FIG. 1 illustrates in top perspective view an exemplary composite mold component according to one embodiment of the present invention.

Referring first to FIG. 1, an exemplary composite mold component according to one embodiment of the present invention is shown in top perspective view. A carbon composite mold component 100 can include a variety of helpful features that can be used to assist in mating with another mold component, in cooling the composite material as a part is formed, and in ejecting the part or otherwise separating it from the mold component after the part is formed.

For example, a moldbase 102 can have a plurality of core and/or cavity mold inserts 110 placed therein to help form features in the carbon composite part to be formed. The core and cavity mold inserts 110 can assist in aligning and/or interlocking various mold components and also to reduce the amount of unwanted flash material that is formed outside of the desired part. One or more guide pins 115 and respective guide pin holes (not shown) can also be formed on the moldbase and/or one or more mold inserts. Such guide pins can further serve to facilitate an accurate alignment of mold components once the composite materials are in place and part formation is to begin. For example, where a mold consist of two mold "halves" or components, then guide pins can assure proper alignment of each half with the other, and also facilitate a reduction in mold damage or wear over time and repeated use. Core and cavity insert interlocks 118 can also be used to facilitate a proper alignment of mold blocks to minimize flash and parting line offsets, as will be readily appreciated. In addition, one or more mounting plates 117 can be coupled to moldbase 102 to facilitate suitable relative movement of mold components before and after the part formation process.

Another feature that can be incorporated into the moldbase 102 can be one or more internal fluid lines 116 embedded therein to facilitate a fluid based cooling of components during the formation of a carbon composite based part. Such fluid lines 116 can be used for water, although air, antifreeze or other suitable cooling fluids may also be used. The use of such internal water lines 116 can result in a more uniform or controlled temperature across the mold surface, such that surface blemishes or irregularities can be eliminated or minimized The resulting cosmetic appearance of the finished composite molded part can then typically be improved. In some embodiments, the internal fluid lines 116 may also be used for heating the mold, such as where a reheat of the part materials is desired, or where particular irregularities in part design may result in a thin material or heat loss in a given region or regions. In such cases, a heated fluid can be provided to one or more select internal fluid lines or locations. One benefit that can be realize through the use of such internal fluid lines is that the overall cycle time to produce a part can be reduced, since heating with platens and cooling with ambient air may not be necessary.

A common concern with forming parts via composite molding is the removal of the part from the mold components after the part has been formed. This is often a manual and time consuming process. Because epoxies and other resins tend to be sticky, there are often issues with the part sticking to the mold in various locations, which can result in surface defects, cracks and other problems to the part after it is finally removed. Various items included herein to minimize these concerns include the use of ejector pins 112 and/or a permanent release friendly coating or layer 150 on the mold surface. Ejector pins 112 can be part of a fluid actuated ejection system, which may have one or more inlets 114 on the moldbase 102.

Although ejector pins are a common technique used in injection molding processes, such items are generally not used in composite mold processes due to the presence of sticky resins that seep into the pin shafts or cavities and cause the ejector pins to fail. Many ejector pin systems require a clearance between the pin and its respective shaft so that the pin can move back and forth to eject a part, and so that air or another fluid can drive the pin. The resin that is inherent to a composite molded part tends to frustrate the clearance or spacing between the pin and shaft wall. The present invention overcomes this problem by providing shaft stoppers such that ejector pins can be used in a composite molding process.

Figure 2:
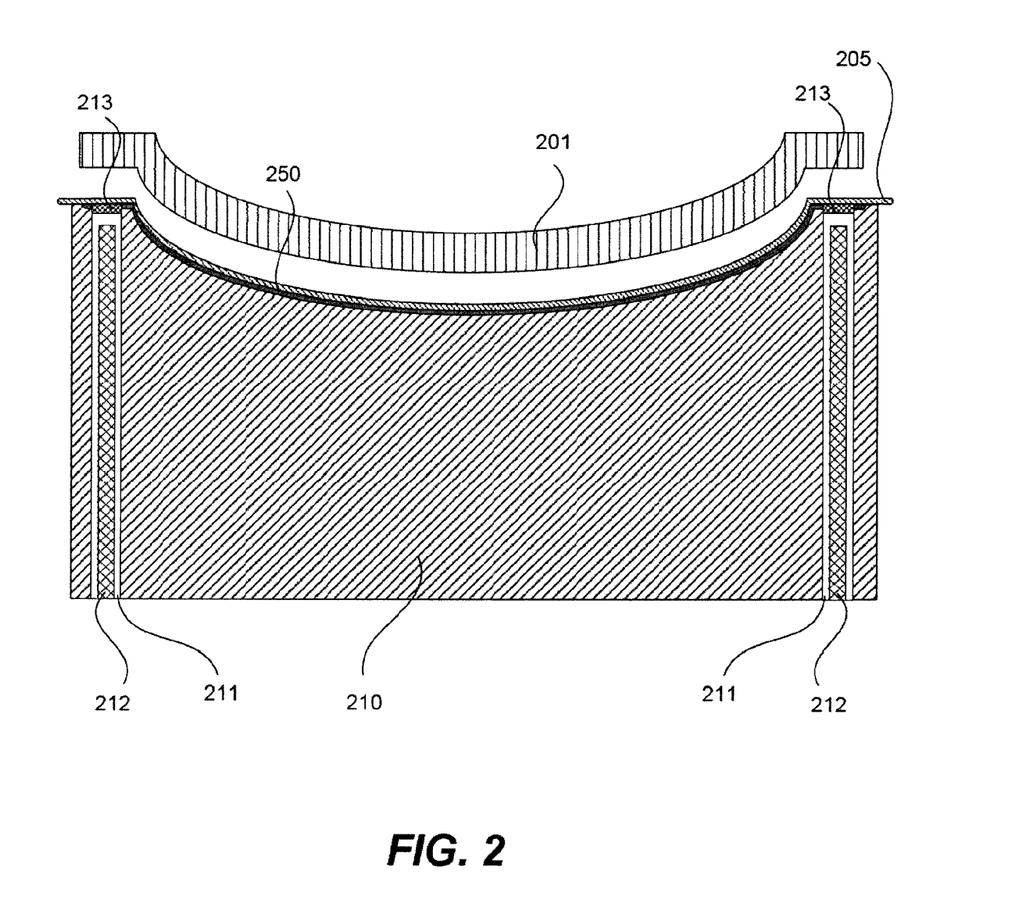
FIG. 2 illustrates in side cross-sectional view an exemplary composite mold component having a plurality of ejector pin shafts with ejector pins and ejector pin shaft stoppers therein according to one embodiment of the present invention.

Turning next to FIG. 2, an exemplary composite mold component having a plurality of ejector pin shafts with ejector pins and ejector pin shaft stoppers therein according to one embodiment of the present invention is illustrated in side cross-sectional view. As shown, a carbon composite part 201 has been formed in a mold including a mold component 210 having a plurality of ejector pin shafts 211 having ejector pins 212 and ejector pin shaft stoppers 213 formed therein. As shown, mold component 210 can be a bottom mold "half," insert, or component, although it will be appreciated that the disclosed ejector pin, shaft and stopper arrangements can also be used with respect to a top mold "half" or component. Further, although the term "mold half" is often used, it will be readily appreciated that some mold components can comprise more or less than half of an overall mold, and that some molds may include more than two mold components that are combined to mold a part. As used herein, the common term "mold half" shall refer to all such mold variations. In addition, mold component 210 can comprise a removable insert that is adapted to be placed within and removed from an associated moldbase.

For purposes of illustration, the formed composite part 201 is shown as being elevated away from the mold insert or component 210, although it will be readily understood that the composite part does contact the mold component or a film or coating thereon. Mold component 210 can include a permanent release layer or coating 250 applied thereto or embedded therein, particularly with respect to any surface regions that are to contact or interact with composite parts being formed. In addition, a thin release film 205 may be situated atop the mold component 210 and release coating 250, with the release film being adapted to further the separation of finished part 201 from mold component 210 after the part forming process.

Again, the composite part 201 meets the mold component 210 along an active surface of the mold component. Ejector pins 212 can act to provide an upward force against the part 201 to eject it away from this active mold surface when a mechanical actuating force (not shown) is provided to the pins. An ejector pin shaft stopper 213 plugs the top of each shaft 211, such that no epoxy or resin flows into the ejector pin shaft while the part 201 is being formed in the mold. The thin release film 205 may also function to substantially prevent or restrict the flow of resin into the ejector pin shafts 212 during part formation.

Ejector pin shaft stopper 213 can be formed from a rubber or similar slightly pliable material, such that it can be press fit into the ejector pin shaft 211. In this manner, the ejector pin 212 pushes the stopper up and out of the shaft when the ejector pin is actuated. As it is being pushed out of the shaft, the stopper then also provides a mechanical force against the formed part 201, thus ejecting or separating the part from the mold surface. The stopper can then be cleaned and reused in the formation of another part, or can be disposable. Each stopper can have a diameter that is preferably the exact diameter of the ejector pin shaft, so as to prevent any resin seepage into the shaft, and is also preferably short in height, so as to minimize the amount of resistive friction between the stopper and the shaft walls as the ejector pin actuates and pushes it up and out of the shaft.

A number of ejector pins can be used for a given mold half or component, and can be strategically located about the mold depending upon the geometry of the mold and part. For example, 6 to 12 ejector pins are thought to be sufficient for some mold components. All of the ejector pins on one or more mold components can be linked to a single actuation system, such that a single switch or command can be used to deliver pressure or force to all of the ejector pins at once to remove a part from the mold. Alternatively, a coordinated release can involve pressure being provided to pins in a stepped or time-lapsed fashion, depending upon the desired removal process.

Such an internal coordinated ejection system can be hydraulic or pneumatic in nature, and can also reduce the cycle time required for the formation of a given composite part, as will be readily appreciated. Further benefits for such an ejection system can be a reduction in surface damages and cosmetic appearances to each part, fewer manual steps in the overall process, improved ergonomics for an operator, and improved mold life, since manual tools for removal are not used. In some embodiments, placement of the ejector pins can be at non-cosmetically important areas of the final product, and at resin overflow or flash areas.

Another feature that can be used to facilitate better production of composite components is a permanent high hardness, low friction release layer or coating 250 that can be applied to the active surface(s) of a mold. As is generally known in the composite molding arts, a temporary releasing agent is typically sprayed or otherwise placed on active mold surfaces before the composite materials are placed therein for part formation. This release agent can be sprayed unevenly or even not at all in some locations, which can result in an uneven finish and/or various blemishes, cracks or even failures when a part is released from the mold. By instead applying a permanent release top layer 250 to the active mold surface, more consistency can be realized in the release of successive parts from the same mold.

Various materials can be used for permanent release layer or coating 250. In particular, the material or materials used for permanent release layer 250 should generally have high hardness and low friction properties, and can preferably bond with steel and other mold type materials. Such materials can include, but are not limited to, for example, nickel-teflon, titanium-nitride, an amorphous carbon/diamond like material, and chrome or chrome alloys, among other suitable materials. One example of a particularly suitable material for release layer 250 can be NEDOX® (NASA material #20386), which is made by General Magnaplate Corporation of Linden, N.J. Permanent release layer 250 can be embedded within or coated atop the active surface of mold component 210, and can be of any suitable thickness as may be desired. For example, a thickness of about one to five microns is thought to be adequate, particularly where permanent release layer 250 is a coating of NEDOX®. More particularly, the thickness can be about two to three microns. In some instances, an intermediate layer might also be used to facilitate with bonding the release layer to the base mold material.

Thin release film 205 may serve two distinct functions. First, film 205 can serve to aid in the separation of finished part 201 from mold component 210. Second, film 205 can also substantially prevent or restrict the flow of resin into the ejector pin shafts 212 during part formation. Thus, thin release film 205 can be used in lieu of or in addition to either or both of permanent release layer or coating 250 and ejector pin shaft stopper 213. Release film 205 can be formed from a thin, flexible material, such as a polymer or other suitable material, and may be sacrificial in nature. That is, the release film can be destroyed and/or disposed of as part of the part formation and separation process.

Further features that can be used with a carbon composite mold design or system can include mounting plates on an exterior portion of each mold half or component, as well as slides and/or lifters that can be actuated by an internal fluid actuation system. Mounting plates can generally aid in fastening the mold into a forming press, as will be readily appreciated. The forming press can then open and close the mold automatically. This reduces the amount of manual intervention needed in the manufacturing process, which in turn reduces safety risks for operators. As in the foregoing features, overall cycle times can be reduced as well, since there is no longer a need to manually remove and reload the mold into the forming press for each part forming cycle.

Sliders and lifters can be used to form undercut features on the exterior or interior portion of the composite part being formed. Lifters can also be used to aid in ejecting the part from the mold upon part completion. The use of such sliders and lifters can eliminate or reduce the need for secondary machining or assembly to form such undercut features after part molding, and can also improve the strength and cosmetic appearance of these features, since they are integrated into the part from the initial molding process.

Figure 3:
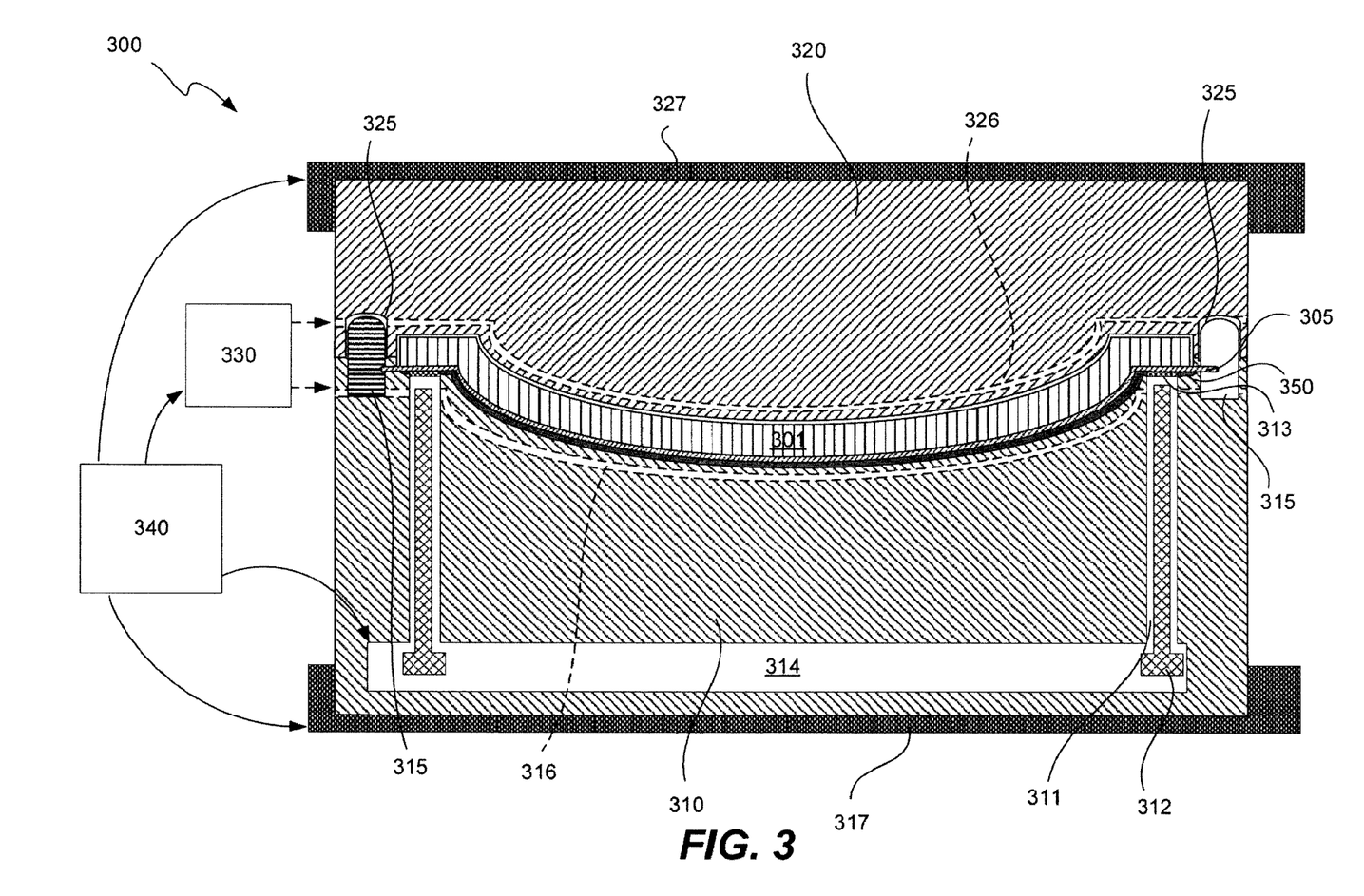
FIG. 3 illustrates in partial side cross-sectional view and partial block diagram format an exemplary composite mold system according to one embodiment of the present invention.

Moving next to FIG. 3, an exemplary composite mold system is shown in partial side cross-sectional view and partial block diagram format according to one embodiment of the present invention. Composite mold system 300 includes a variety of items, such as a first mold component 310, a second mold component 320, a fluid heating/cooling system 330 and a controller or processor 340 that is adapted to interact with or control at least these various items 310, 320, 330 to automate the process of manufacturing composite part 301. Similar to mold component 210 above, mold component 310 can include a plurality of ejector pin shafts 311 having ejector pins 312 and ejector pin shaft stoppers 313 that serve to block any seepage of resin into the shafts during the formation of part 301. Ejector pins 312 can be actuated by a common hydraulic or pneumatic pin control system 314, which may also be embedded into one or more mold components. This ejector pin hydraulic or pneumatic pin system may also be controlled by processor 340, so as to further automate the manufacturing process. Also similar to mold component 210 above, mold component 310 can have a permanent release layer or coating 350, and may also be associated with a thin release film 305.

One or more guide pins 315 in one mold half or component can be adapted to mate with one or more guide pin holes 325 in a mating mold half or component, such that an accurate alignment between mold components can be assured when mold components are combined to form a part. In addition, one or more fluid channels for controlling temperature can be embedded into one or more of the mold components. For example, fluid line 316 is embedded in lower mold half or component 310, while fluid line 326 is embedded in upper mold half or component 320. Of course, a plurality of fluid lines may be used, and such lines can be arranged in numerous patterns to aid with controlling temperatures in the mold during the part formation process. Such fluid lines 316, 326 can be used for heating and/or cooling of the mold components 310, 320 and/or part 301, and these fluid lines can be fed or maintained by a fluid heating/cooling system 330.

Similar to the foregoing embodiment, one or more active surfaces of the various mold components can include a permanent release coating (not shown), which can aid in the removal or separation of a finished part from the various mold components. Another feature that can be used to help streamline and/or automate the composite part forming process are mounting plates. Mounting plate 317 can be coupled to mold component 310, while mounting plate 327 can be coupled to mold component 320. These mounting plates are preferably formed such that separation of the mold components from each other can be more easily accomplished, such as by applying force to the mounting plates or one or more tools or items that can attach to such plates. For example, an external forming press can be adapted to provide force to mounting plates while the mounting plates are coupled to their respective mold components. Through the automation of forming press actions, the forming press itself can then be used to apply the compression and separation forces to push and pull the mold components with respect to each other before and after the composite parts are formed therein.

Thus, an overall composite mold system can include a first mold and a second mold, such as mold components 310 and 320 shown in FIG. 3. The first and second molds can generally provide a core and cavity for forming a composite based part, such as a carbon fiber and epoxy based part. Such a part can be, for example, an outer housing component for a portable electronic device, such as a laptop computer. The shape of the core and cavity generally define the form and feel and look of the composite part, which again can be a laptop housing component. The molds may be designed for providing an aesthetic outer surface and an inner surface having one or more internal features. Again, the inside surface of the mold cavity and core may include permanent high hardness and low friction "release" surfaces. The molds may also include guide pins and interlocks configured to align the mold components in a reliable fashion. The mold system may further include slides and lifters for forming internal features on the inside surface of the part. These may for example correspond to mounting brackets, channels, undercuts, bosses and the like.

Figure 4:
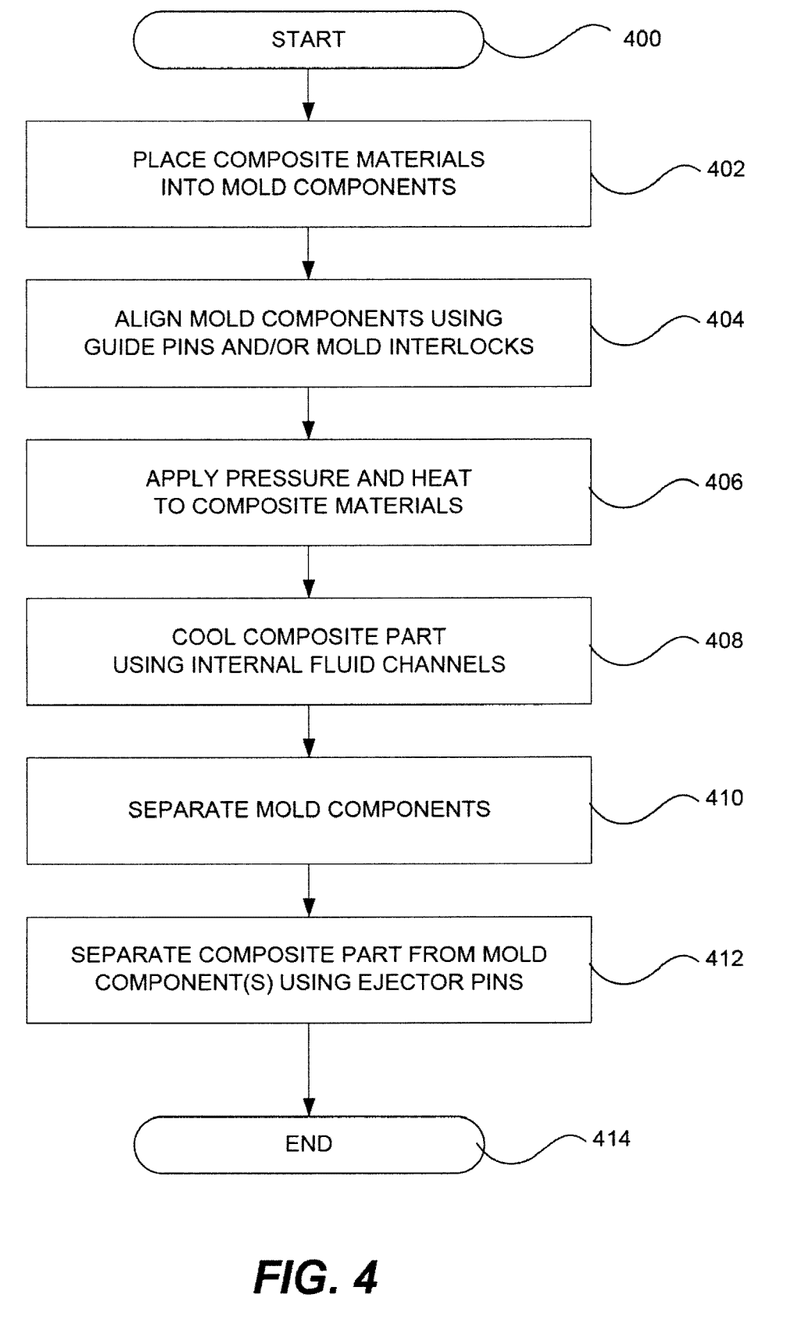
FIG. 4 illustrates a flow chart of an exemplary method of forming a carbon composite part according to one embodiment of the present invention.

Continuing to FIG. 4, a flow chart of an exemplary method of forming a carbon composite part according to one embodiment of the present invention is provided. After a starting step 400, a first process step 402 involves the placement of composite part materials into a mold system. At subsequent process step 404, two or more mold halves or components are aligned in a reliable fashion, such as by using guide pin(s), hole(s) and/or other interlocks between mold components. At process step 406, the mold components are then pressed together and heat is applied to the composite materials, with such elevated pressure and temperature resulting in the flowing of the composite materials to conform to the mold shape(s). After a sufficient amount of time, the composite part is then cooled at process step 408 by way of the internal fluid line(s) within the mold component(s).

At process step 410, the mold components are then separated so that the finished composite part can be removed. Such separation can involve applying mechanical forces to one or more mounting plates that are coupled to the mold component(s). At process step 412, removal of the part from the mold halves or components can involve the use of a plurality of ejector pins, which may be coupled to a hydraulic or pneumatic ejector system. As noted above, the ejector pin shafts can include stoppers fitted into the ends of the shafts proximate to the composite part, such that resin does not enter the ejector pin shafts during part formation. The method then ends at end step 414.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method of forming a carbon composite part, comprising:
  placing one or more materials including a carbon fiber component and a resin component in one or more mold cavities of a moldbase, the moldbase comprising one or more mold inserts that combine to form the one or more mold cavities;
  aligning the one or more mold inserts;
  heating the one or more materials;
  forming the carbon composite part; and
  ejecting the carbon composite based part from its respective mold insert by using one or more elector pins, the one or more ejector pins positioned within one or more respective ejector pin shafts that are formed within at least one of the mold inserts, each ejector pin shaft being associated with a pin shaft stopper fitted within the ejector pin shaft, wherein at least one pin shaft stopper is distinct from any of the ejector pins, wherein the pin shaft stopper is adapted to transfer a mechanical force from a respective ejector pin to the carbon composite based part for ejection of the carbon composite based part from a respective mold insert, and wherein the pin shaft stopper is further adapted to prevent the substantial passage of said component into its associated ejector pin shaft during formation of the carbon composite based part.

2. The method of claim 1, wherein at least one of the mold inserts comprises a permanent release coating along a surface that contacts the carbon fiber and resin components to facilitate release of the carbon composite based part from its respective mold insert.

3. The method of claim 2, wherein the permanent release coating has a thickness of about 1 to 5 microns.

4. The method of claim 2, wherein at least one of the mold inserts further comprises a removable film proximate to the permanent release coating to facilitate the release of the carbon composite based part from its respective mold insert, and wherein the removable film can be readily removed from both its respective mold insert and the carbon composite based part.

5. The method of claim 4, wherein the removable film has a thickness of about 10 to 20 microns.

6. The method of claim 4, wherein the removable film covers a top of one or more of the ejector pin shafts during formation of the carbon composite based part.

7. The method of claim 1, the step of heating one or more materials further comprising applying fluid based mechanical forces to the ejector pins.

8. The method of claim 7, wherein applying fluid based mechanical forces comprises using a fluid actuated ejection system that uses a gas to provide gas based mechanical forces.

9. The method of claim 1, the step of forming the carbon composite part further comprising cooling the one or more materials including the carbon fiber component and the resin component in the one or more mold inserts using one or more internal fluid lines embedded in the moldbase to form the carbon composite based part.

10. A method of forming a carbon composite part, the method comprising:
  placing a moldable material in a mold cavity, the moldable material comprising a carbon fiber component and a resin component, and wherein the mold cavity is formed from one or more mold components, at least one mold component having a permanent release coating fainted on a surface that contacts the carbon fiber and resin components, the permanent release coating being adapted to facilitate release of the molded part from its respective mold component;

forming a molded part; and releasing the molded part from its respective mold component by using a plurality of ejector pins located within a plurality of respective ejector pin shafts that are formed within at least one of the one or more mold components, the plurality of ejector pins being adapted to aid in releasing the molded part from its respective mold component, wherein each ejector pin has an associate ejector shaft, at least one ejector pin shaft having an ejector pin shaft cover positioned proximate to and being separated from at least one of the plurality of ejector pins, wherein the ejector pin shaft cover is adapted to transfer a mechanical force from a respective ejector pin to the molded part for ejection of the molded part from its respective mold component, and wherein the ejector pin shaft cover is further adapted to prevent the substantial passage of the resin component into its respective ejector pin shaft during formation of the molded part.

11. The method of claim 10, wherein the permanent release coating has a thickness of about 1 to 5 microns.

12. The method of claim 10, wherein the ejector pin shaft cover comprises a stopper positioned within the ejector pin shaft.

13. The method of claim 10, wherein the ejector pin shaft cover comprises a removable film positioned proximate to the permanent release coating and that also covers a top of the ejector pin shaft.

14. The method of claim 10, the step of releasing the molded part from its respective mold component further comprising applying fluid based mechanical forces to the plurality of ejector pins.

15. The method of claim 14, wherein the fluid based mechanical forces are gas based mechanical forces.

16. The method of claim 10, wherein the one or more mold components comprises a removable mold insert.

17. The method of claim 10, the step of forming a molded part further comprising aligning the mold components with each other by using one or more guide pins, guide pin receiving holes, or both located on at least one of the one or more mold components.

18. A method of forming molded parts, comprising:

forming a molded part by placing one or more moldable materials in a first mold portion and a second mold portion, the first mold portion including a first mold cavity and the second mold portion adapted to mate with the first mold portion; and ejecting the molded part from at least one of the first mold portion and the second mold portion by using a plurality of ejector pins located within a plurality of respective ejector pin shafts that are formed within at least one of the first mold portion and the second mold portion wherein at least one elector pin shaft has an associated ejector pin shaft cover that is distinct from and positioned proximate to at least one of the plurality of ejector pins, wherein the ejector pin shaft cover is adapted to transfer a mechanical force from a respective ejector pin to the molded part for ejection of the molded part from a respective mold portion.

19. The method of claim 18, wherein the one or more moldable materials comprises a carbon fiber component and a resin component.

20. The method of claim 18, wherein the ejector pin shaft cover comprises a stopper positioned within the ejector pin shaft.

21. The method of claim 18, wherein the ejector pin shaft cover comprises a removable film positioned to cover the top of the ejector pin shaft.

22. The method of claim 18, wherein the ejector pin shaft stopper is formed from a pliable material.

* * * * *

UNITED STATES PATENT AND TRADEMARK OFFICE
CERTIFICATE OF CORRECTION

PATENT NO. : 8,734,706 B2
APPLICATION NO. : 13/566251
DATED : May 27, 2014
INVENTOR(S) : Choiniere et al.

Page 1 of 1

It is certified that error appears in the above-identified patent and that said Letters Patent is hereby corrected as shown below:

In the Claims

Column 10, line 13, claim 1, delete "elector" and insert --ejector--.

Column 12, line 18, claim 18, delete "elector" and insert --ejector--.

Signed and Sealed this
Fifth Day of August, 2014

Michelle K. Lee
*Deputy Director of the United States Patent and Trademark Office*